(12) United States Patent
Smith et al.

(10) Patent No.: US 9,436,860 B2
(45) Date of Patent: Sep. 6, 2016

(54) OPTICAL INDICIA READING APPARATUS WITH MULTIPLE IMAGE SENSORS

(71) Applicant: Hand Held Products, Inc., Fort Mill, SC (US)

(72) Inventors: Taylor Smith, Charlotte, NC (US); Yong Liu, Suzhou (CN)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/022,610

(22) Filed: Sep. 10, 2013

(65) Prior Publication Data

US 2014/0263645 A1     Sep. 18, 2014

(30) Foreign Application Priority Data

Sep. 10, 2012  (CN) .......................... 2012 1 0375625

(51) Int. Cl.
*G06K 19/00* (2006.01)
*G06K 7/10* (2006.01)

(52) U.S. Cl.
CPC ....... *G06K 7/10722* (2013.01); *G06K 7/10821* (2013.01)

(58) Field of Classification Search
USPC ................................ 235/435, 439, 440, 462
See application file for complete search history.

(56) References Cited

U.S. PATENT DOCUMENTS

| | | |
|---|---|---|
| 5,974,066 A | 10/1999 | Wu et al. |
| 6,059,188 A | 5/2000 | diFazio et al. |
| 6,811,085 B2 | 11/2004 | Carlson et al. |
| 7,252,233 B2 | 8/2007 | Takiguchi et al. |
| 7,336,814 B2 | 2/2008 | Boca et al. |
| 7,357,325 B2 * | 4/2008 | Zhu et al. ................ 235/462.22 |
| 7,380,721 B2 | 6/2008 | Zhang |

(Continued)

FOREIGN PATENT DOCUMENTS

| | | |
|---|---|---|
| EP | 2416276 A1 | 8/2012 |
| WO | 2011156928 A2 | 12/2011 |

OTHER PUBLICATIONS

GB Office Action dated Mar. 3, 2014; 4 pages.

(Continued)

*Primary Examiner* — Matthew Mikels
(74) *Attorney, Agent, or Firm* — Additon, Higgins & Pendleton, P.A.

(57) ABSTRACT

Optical indicia reading apparatus can comprise a microprocessor, a memory, and a plurality of wafer level camera (WLC) modules. Each WLC module can comprise an image sensor and a focusing lens, and optionally, an optical bandpass filter (BPF) configured to pass light waves within a pre-defined wavelength range. Each WLC module can be configured to output a signal representative of the light incident on the image sensor. The optical axis of a first WLC module can be spatially disposed relatively to an optical axis of a second WLC module so that the fields of view (FOVs) of the WLC modules at least partially overlap. The depth of field (DOF) of a first WLC module can at least partially overlap with the DOF of a second WLC module. The optical indicia reading apparatus can be configured to generate an image frame by processing two or more signals of the plurality of signals outputted by the WLC modules. The optical indicia reading apparatus can be further configured to output an image frame comprising an image of decodable indicia and/or decoded message corresponding to the decodable indicia.

21 Claims, 4 Drawing Sheets

(56) References Cited

U.S. PATENT DOCUMENTS

| | | |
|---|---|---|
| 7,405,100 B1 | 7/2008 | Mostafazadeh et al. |
| 7,680,192 B2 | 3/2010 | Kaplinsky |
| 7,903,871 B2 | 3/2011 | Kaplinsky et al. |
| 7,969,469 B2 | 6/2011 | Guidash |
| 8,004,501 B2 | 8/2011 | Harrison |
| 8,120,651 B2 | 2/2012 | Ennis |
| 8,159,559 B2 | 4/2012 | Senba |
| 8,179,393 B2 | 5/2012 | Minear et al. |
| 8,184,196 B2 | 5/2012 | Forutanpour |
| 8,248,386 B2 | 8/2012 | Harrison |
| 2006/0043513 A1 | 3/2006 | Kim |
| 2007/0080283 A1 | 4/2007 | Kim et al. |
| 2008/0048037 A1 | 2/2008 | Zhang |
| 2008/0180566 A1 | 7/2008 | Singh et al. |
| 2008/0247672 A1 | 10/2008 | Kaplinsky et al. |
| 2008/0306708 A1 | 12/2008 | Germain, IV et al. |
| 2009/0141146 A1 | 6/2009 | Guidash |
| 2010/0032781 A1* | 2/2010 | Ryu .................... 257/432 |
| 2010/0157117 A1 | 6/2010 | Wang |
| 2010/0187557 A1 | 7/2010 | Samoilov et al. |
| 2010/0246902 A1 | 9/2010 | Rowe et al. |
| 2010/0252633 A1* | 10/2010 | Barkan et al. ........... 235/462.24 |
| 2011/0042796 A1 | 2/2011 | Chang et al. |
| 2011/0074931 A1 | 3/2011 | Bilbrey et al. |
| 2011/0193225 A1 | 8/2011 | Chen et al. |
| 2011/0233782 A1 | 9/2011 | Chang et al. |
| 2011/0299137 A1 | 12/2011 | Engholm et al. |
| 2012/0031977 A1 | 2/2012 | Havens et al. |
| 2012/0113266 A1 | 5/2012 | Golan et al. |
| 2012/0162511 A1 | 6/2012 | Hewes et al. |
| 2012/0188409 A1 | 7/2012 | Gallagher et al. |
| 2012/0188420 A1 | 7/2012 | Black et al. |
| 2012/0189293 A1 | 7/2012 | Cao et al. |
| 2012/0193421 A1 | 8/2012 | Sauerwein, Jr. |
| 2012/0200766 A1 | 8/2012 | Hjelmstrom et al. |
| 2013/0001309 A1* | 1/2013 | Barkan .................... 235/455 |

OTHER PUBLICATIONS

GB Search Report dated Feb. 28, 2014, 1 page.

Second United Kingdom Exam Report in related Application GB1615793.8, Dated May 25, 2016, 4 pages.

* cited by examiner

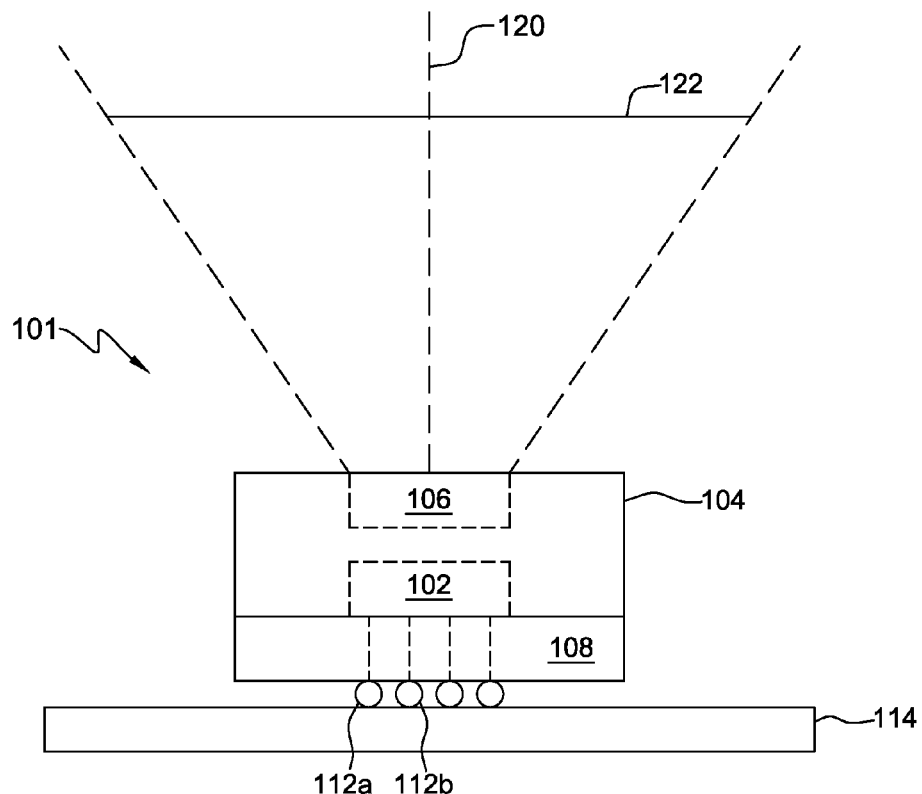
FIG. 1a
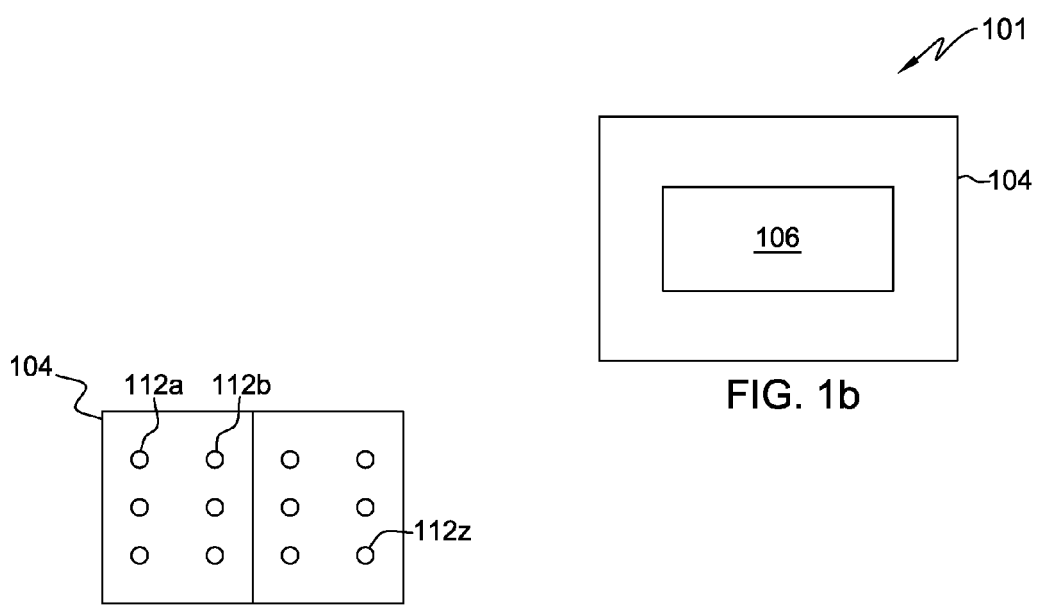
FIG. 1b
FIG. 1c

OPTICAL INDICIA READING APPARATUS WITH MULTIPLE IMAGE SENSORS

CROSS REFERENCE TO RELATED APPLICATIONS

This application claims the benefit of priority under 35 U.S.C. §119 from Chinese Patent Application No. 201210375625.7 filed Sep. 10, 2012 in The State Intellectual Property Office of the People's Republic of China (SIPO). The above application (Chinese Patent Application No. 201210375625.7 filed Sep. 10, 2012 in SIPO) is incorporated herein by reference in its entirety.

FIELD OF THE INVENTION

The present invention relates, in general, to optical indicia reading systems and apparatus, and is particularly related to optical indicia reading apparatus equipped with wafer-level camera (WLC) modules.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Some indicia reading terminals are adapted to read bar code symbols including one or more of one dimensional (1D) bar codes, stacked 1D bar codes, and two dimensional (2D) bar codes. Other indicia reading terminals are adapted to read OCR characters while still other indicia reading terminals are equipped to read both bar code symbols and OCR characters.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIGS. 1a-1c schematically depict an illustrative embodiment of a WLC module;

SUMMARY OF THE INVENTION

Figure 2A:
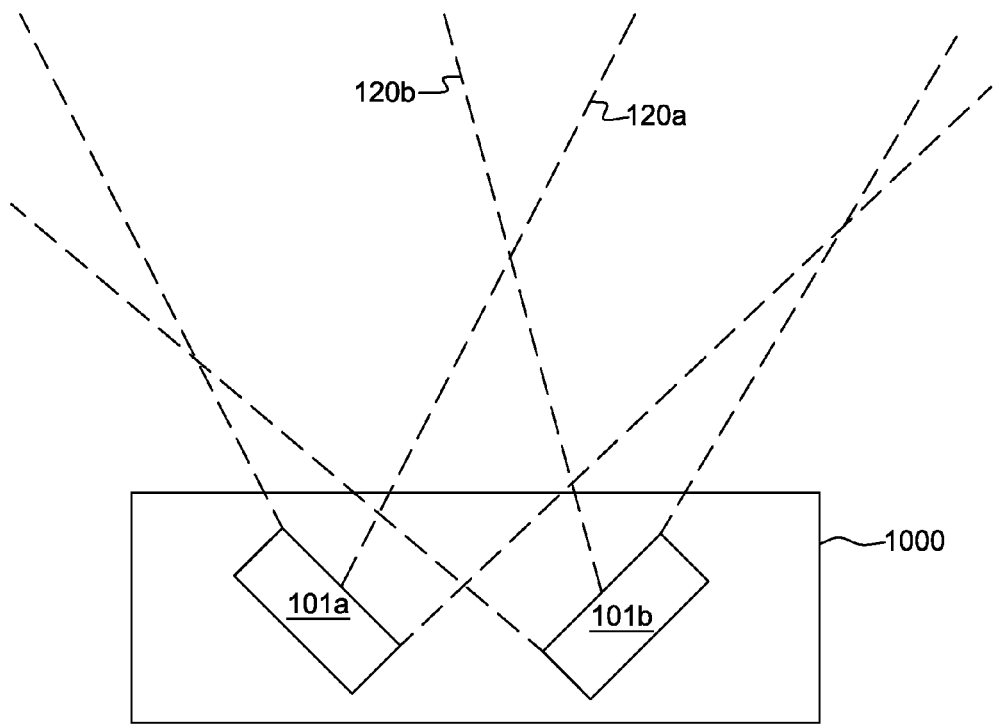
FIGS. 2a-2b schematically depict illustrative embodiments of arrangements of two or more WLC modules having overlapping fields of view and/or depths of field.

In one embodiment, there is provided an optical indicia reading apparatus comprising a microprocessor, a memory, and a plurality of wafer level camera (WLC) modules. Each WLC module can comprise an image sensor and a focusing lens, and can be configured to output a signal representative of the light incident on the image sensor. The optical axis of a first WLC module can be spatially disposed relatively to an optical axis of a second WLC module so that the fields of view (FOVs) of the WLC modules at least partially overlap. The optical indicia reading apparatus can be configured to generate an image frame by processing two or more signals of the plurality of signals outputted by the WLC modules. The optical indicia reading apparatus can be further configured to output an image frame comprising an image of decodable indicia and/or decoded message corresponding to the decodable indicia.

In another embodiment, there is provided an optical indicia reading apparatus comprising a microprocessor, a memory, and a plurality of wafer level camera (WLC) modules. Each WLC module can comprise an image sensor and a focusing lens, and can be configured to output a signal representative of the light incident on the image sensor. The depth of field (DOF) of a first WLC module can at least partially overlap with the DOF of a second WLC module. The optical indicia reading apparatus can be configured to generate an image frame by processing two or more signals of the plurality of signals outputted by the WLC modules. The optical indicia reading apparatus can be further configured to output an image frame comprising an image of decodable indicia and/or decoded message corresponding to the decodable indicia.

In another embodiment, there is provided an optical indicia reading apparatus comprising a microprocessor, a memory, and a plurality of wafer level camera (WLC) modules. Each WLC module can comprise an image sensor, a focusing lens, and an optical band-pass filter (BPF) configured to pass light waves within a pre-defined wavelength range. Each WLC module can be configured to output a signal representative of the light incident on the image sensor. Band-pass filters of at least two WLC modules can have different wavelength ranges. The optical indicia reading apparatus can be configured to generate an image frame by processing two or more signals of the plurality of signals outputted by the WLC modules. The optical indicia reading apparatus can be further configured to output an image frame comprising an image of decodable indicia and/or decoded message corresponding to the decodable indicia.

In a further aspect, at least two WLC modules can be configured to have substantially similar DOFs and/or FOVs.

In a further aspect, the optical indicia reading apparatus can further comprise at least one illumination light source and/or at least one aiming light source.

In a further aspect, the processing of two or more signals outputted by WLC modules can be performed by the microprocessor and/or by an application-specific integrated circuit (ASIC).

In a further aspect, the signal outputted by at least one WLC module can be provided by an analog signal or a digital signal.

In a further aspect, the optical indicia reading apparatus can further comprise a portable housing configured to receive the microprocessor, the memory, and the plurality of WLC modules.

DETAILED DESCRIPTION OF THE INVENTION

Currently, the cost of digital imager-based optical indicia readers remains significantly above that of laser or linear scanners. However, digital-imager based optical indicia readers are preferred for many applications since they offer much more extensive functionality.

One way to reduce the cost of a digital-imager based optical indicia reader is to employ wafer-level camera (WLC) modules. A WLC module is an optoelectronic device comprising an image sensor and other components, such as micro-lenses, all mounted on a single die. To extend the working reading range and/or the field of view (FOV) of an optical indicia reader, multiple WLC modules can be employed within a single apparatus, as described in details herein infra.

According to several illustrative embodiments, there is provided an optical indicia reading apparatus comprising a microprocessor, a memory, a communication interface, and a plurality of WLC modules, all disposed within a common housing (e.g., a portable housing). Each WLC module can comprise a solid-state image sensor (e.g., a CMOS image sensor) a focusing lens, and other optoelectronic components, all mounted on a single die.

In one embodiment, the optical axes of two or more WLC modules can be spatially oriented to provide at least partial overlap between the FOV of each WLC module and the FOV at least one neighboring WLC module, thus effectively increasing the FOV of the indicia reading apparatus. In another embodiment, two or more WLC modules can have similar focal ratios, and hence at least partially overlapping depths of field (DOF), thus effectively increasing the DOF of the indicia reading apparatus. In another embodiment, each WLC module can comprise an optical band pass filter (BPF) configured to pass light waves within a pre-defined wavelength range, and two or more WLC modules can have BPFs with different wavelength ranges. In another embodiment, the optical indicia reading apparatus can comprise two or more groups of WLC modules configured to increase the FOV of the optical indicia reading apparatus, increase the DOF of the optical indicia reading apparatus, and/or provide the image filtering according to the above described embodiments.

In a further aspect, the optical indicia reading apparatus can be configured to capture an image frame by reading out a plurality of analog signals outputted by the plurality of WLC modules, and converting the analog signals into a plurality of digital signals. The optical indicia reading apparatus can be configured to output the captured image frame comprising an image of decodable indicia and/or output a decoded message corresponding to the decodable indicia.

An illustrative embodiment of a WLC module is now being described with references to FIGS. 1a (side view), 1b (top view), and 1c (bottom view). A WLC module 101 can include a solid state image sensor 102 fabricated within a die 104. Micro-lens 106 can be positioned over image sensor 102. WLC module 101 can further comprise interposer 108 providing electrical interface between image sensor 102 and ball grid array (BGA) comprising a plurality of solder balls 112a-112z to be soldered to substrate 114 provided, e.g., by a printed circuit board. A skilled artisan would appreciate the fact that other types of electromechanical interfaces, including pin grid array (PGA) and leadless chip carrier (LCC), are within the scope of this disclosure. In some embodiments, WLC module 101 can further comprise an optical band-pass filter (BPF) 116 disposed over image sensor 102. In some embodiments, WLC module can comprise other optoelectronic components (not shown in FIGS. 1a-1c). In a further aspect, WLC module 101 can be configured to output analog signal representative of light incident on image sensor 102.

In a further aspect, optical axis 120 of WLC module 101 can be described as an imaginary line defining the path of light incident onto the surface of image sensor 102. In an illustrative embodiment, optical axis 120 can be perpendicular to the surface of image sensor 102.

Field of view (FOV) of WLC module 101 can be defined as the observable extent of the environment that can be imaged by the WLC module at any given moment. In one illustrative embodiment, the FOV 122 can be defined by the effective focal length of lens 106, and the size of sensor 102. The spatial position of FOV 122 can be defined by the direction of optical axis 120, the latter being a center line of the spatial angle of view.

Depth of field (DOF) of WLC module 101 can be defined as the distance between the nearest and farthest objects within the FOV that in the image taken by the WLC module would have the edge sharpness exceeding a pre-defined threshold value. DOF can be defined by the focal ratio of the WLC module, i.e., by the ratio of the focal length of lens 106 and the effective aperture.

As noted herein supra, multiple WLC modules can be employed within a single optical indicia reading apparatus in order to extend its working reading range and/or FOV. In one embodiment, schematically shown in FIG. 2a, optical axes 120a-120b of two or more WLC modules 101a-101b can be spatially oriented to provide at least partial overlap between the FOV 122a of each WLC module and the FOV 122b at least one neighboring WLC module, thus effectively increasing the FOV 122 of the indicia reading apparatus 1000. In one embodiment, the FOVs of two neighboring WLC modules can overlap by less than 50% of their respective FOVs.

In a further aspect, indicia reading apparatus 1000 can be configured to read a plurality of analog signals outputted by the plurality of WLC modules, convert the analog signals into digital signals. Indicia reading apparatus 1000 can be further configured to process the digital signals, including removing the overlapping areas of the FOVs of the individual WLC modules, to yield a single image frame. Thus, the FOV corresponding to the resulting image frame would be more than the FOVs of the individual WLC modules.

Figure 2B:
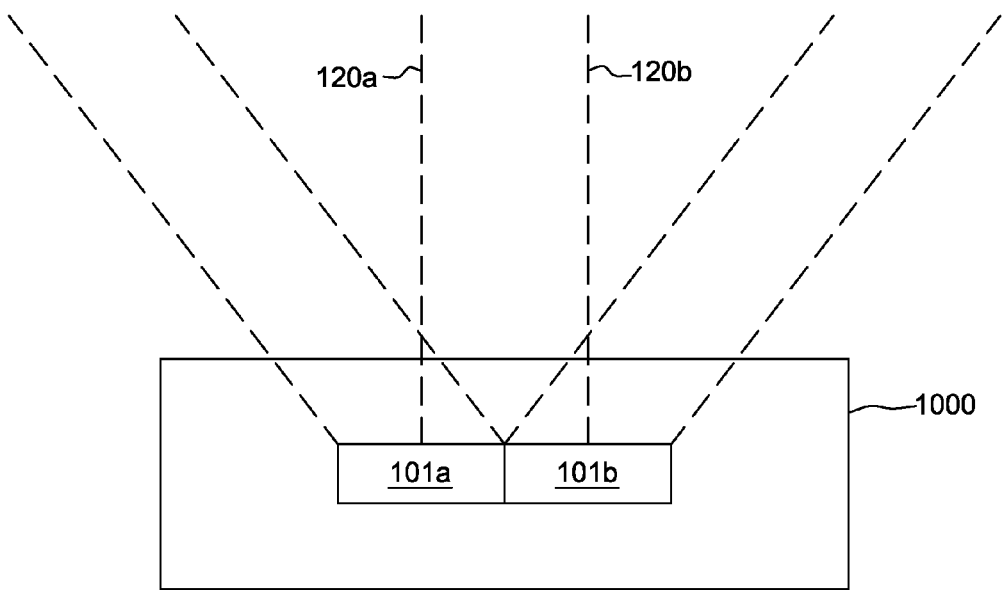

In another illustrative embodiment, schematically shown in FIG. 2b, two or more WLC modules 101a-101b of the indicia reading apparatus 1000 can be configured so that their respective DOF ranges at least partially overlap, while their respective optical axes 120a-120b are spatially oriented in substantially similar directions (i.e., the angle between optical axes of two WLC modules is less than a pre-defined threshold values), thus effectively increasing the DOF of the indicia reading apparatus 1000. In one embodiment, the DOF ranges of at least two WLC modules of the plurality of WLC modules can overlap by less than 50% of their respective DOFs.

In a further aspect, indicia reading apparatus 1000 can be configured to read a plurality of analog signals outputted by the plurality of WLC modules, convert the analog signals into digital signals. Indicia reading apparatus 1000 can be further configured to process the digital signals to yield a single image frame. Thus, the DOF corresponding to the resulting image frame would be more than the DOFs of the individual WLC modules.

In another illustrative embodiment, each WLC module of the plurality of WLC modules can comprise an optical band pass filter (BPF) configured to pass light waves within a pre-defined wavelength range, and two or more WLC modules can have BPFs with different wavelength ranges.

In a further aspect, indicia reading apparatus 1000 can be configured to read a plurality of analog signals outputted by the plurality of WLC modules, convert the analog signals into digital signals. Indicia reading apparatus 1000 can be further configured to process the digital signals to yield a single image frame.

In one embodiment, the above described image processing can be performed by one or more software processes executed by a general purpose microprocessor, such as CPU of the indicia reading apparatus 1000. In another embodiment, the above described image processing can be performed by specialized circuitry, such as an application-specific integrated circuit (ASIC). In another embodiment, the above described image processing can be performed by a combination of specialized circuitry and one or more software processes executed by a general purpose microprocessor.

Figure 3:
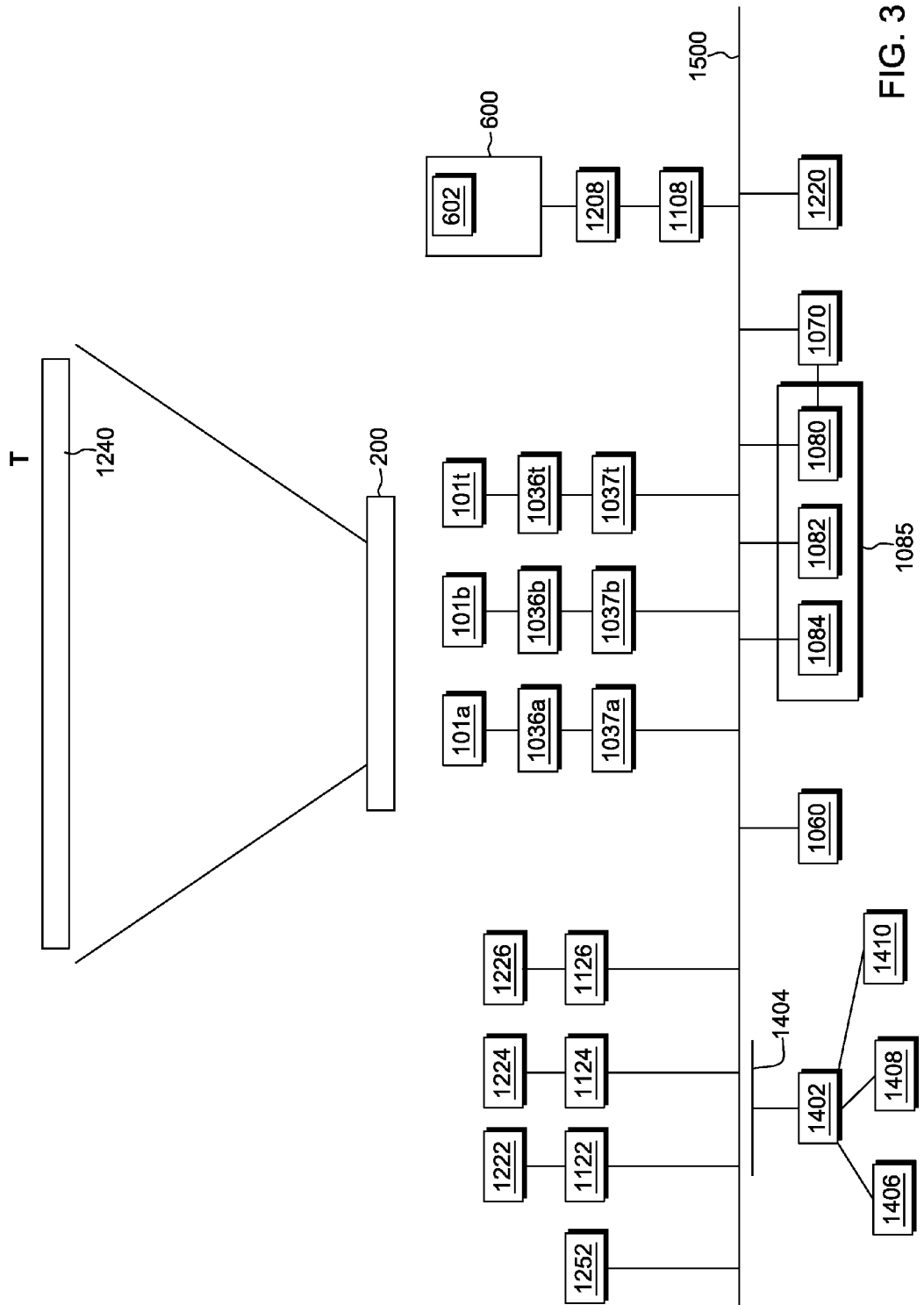
FIG. 3 is a component diagram of an illustrative embodiment of the indicia reading apparatus described herein.

Component diagram of an illustrative embodiment of indicia reading apparatus 1000 is now being described with references to FIG. 3. Housing 1014 can be configured to receive other components of apparatus 1000. Apparatus 1000 can comprise a plurality of WLC modules 101a-101z. As described in details herein supra, each WLC module 101 can include a solid state image sensor and a micro-lens 106 positioned over the image sensor. Each WLC module 101 can be configured to output analog signal representative of light incident on the solid state image sensor.

Apparatus 100 can further comprise a plurality of amplifiers 1036a-1036z communicatively coupled to the outputs of respective WLC modules 101a-101z, and a plurality of analog-to-digital (A/D) converters 1037a-1037z configured to convert amplified analog signals into the digital form. In the course of operation of apparatus 1000, image signals can be read out of image sensors of WLC modules 101a-101z, processed and described herein supra, and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in RAM 1080 and subject such image data to various image processing algorithms. Apparatus 1000 can include a direct memory access unit (DMA) 1070 for routing image information read out from image sensor 1032 that has been subject to conversion to RAM 1080. In another embodiment, apparatus 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope of this disclosure.

Referring to further aspects of apparatus 1000, imaging lens assembly 200 can be adapted for focusing an image of a decodable indicia 15 located within a field of view 1240 on a substrate T onto WLC modules 101a-101z. Lens assembly 200 can be adapted to be capable of multiple focal lengths and multiple planes of optimum focus (best focus distances).

Apparatus 1000 can include an illumination subsystem 800. Illumination subsystem 800 can include a light source bank 500, comprising one or more light sources. Illumination subsystem 800 can further comprise light shaping optics 300, including, for example, one or more lenses, diffusers, mirrors and/or prisms Apparatus 1000 can also comprise an aiming subsystem 600 for projecting an aiming pattern. Aiming subsystem 600, which can comprise a light source bank, can be coupled to aiming light source bank power input unit 1208 for providing electrical power to a light source bank of aiming subsystem 600. The aiming light source bank may be, for example, one or more light sources 602. Aiming light source bank power input unit 1208 can be coupled to system bus 1500 via interface 1108 for communication with CPU 1060.

In another aspect, apparatus 1000 can include power supply 1402 that supplies power to a power grid 1404 to which electrical components of apparatus 1000 can be connected. Power supply 1402 can be coupled to various power sources, e.g., a battery 1406, a serial interface 1408 (e.g., USB, RS232), and/or AC/DC transformer 1410).

Apparatus 1000 can also include a number of peripheral devices including trigger 1220 which may be used to make active a trigger signal for activating frame readout and/or certain decoding processes. Apparatus 1000 can be adapted so that activation of trigger 1220 activates a trigger signal and initiates a decode attempt. Specifically, apparatus 1000 can be operative so that in response to activation of a trigger signal, a succession of frames can be captured by way of read out of image information from WLC modules 101a-101z (typically in the form of analog signals) and then storage of the image information after conversion into system memory 1080 (which can buffer one or more of the succession of frames at a given time). CPU 1060 can be operative to subject one or more of the succession of frames to a decode attempt.

For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. CPU 1060, which, as noted, can be operative in performing processing for attempting to decode decodable indicia, can be incorporated into an integrated circuit disposed on circuit board.

Apparatus 1000 can also include a display 1222 coupled to system bus 1500 and in communication with CPU 1060, via interface 1122, as well as pointer mechanism 1224 in communication with CPU 1060 via interface 1124 connected to system bus 1500. Apparatus 1000 can also include a keyboard 1226 coupled to system bus 1500 via interface 1126.

Apparatus 1000 may include a network communication interface 1252 coupled to system bus 1500 and in communication with CPU 1060, via interface 1152. Network communication interface 1252 may be configured to communicate with an external computer through a network.

Apparatus 1000 can capture frames of image data at a rate known as a frame rate. A typical frame rate is 60 frames per second (FPS) which translates to a frame time (frame period) of 16.6 ms. Another typical frame rate is 30 FPS which translates to a frame time (frame period) of 33.3 ms per frame. A frame rate of apparatus 1000 can be increased (and frame time decreased) by decreasing of the frame picture size.

Figure 4:
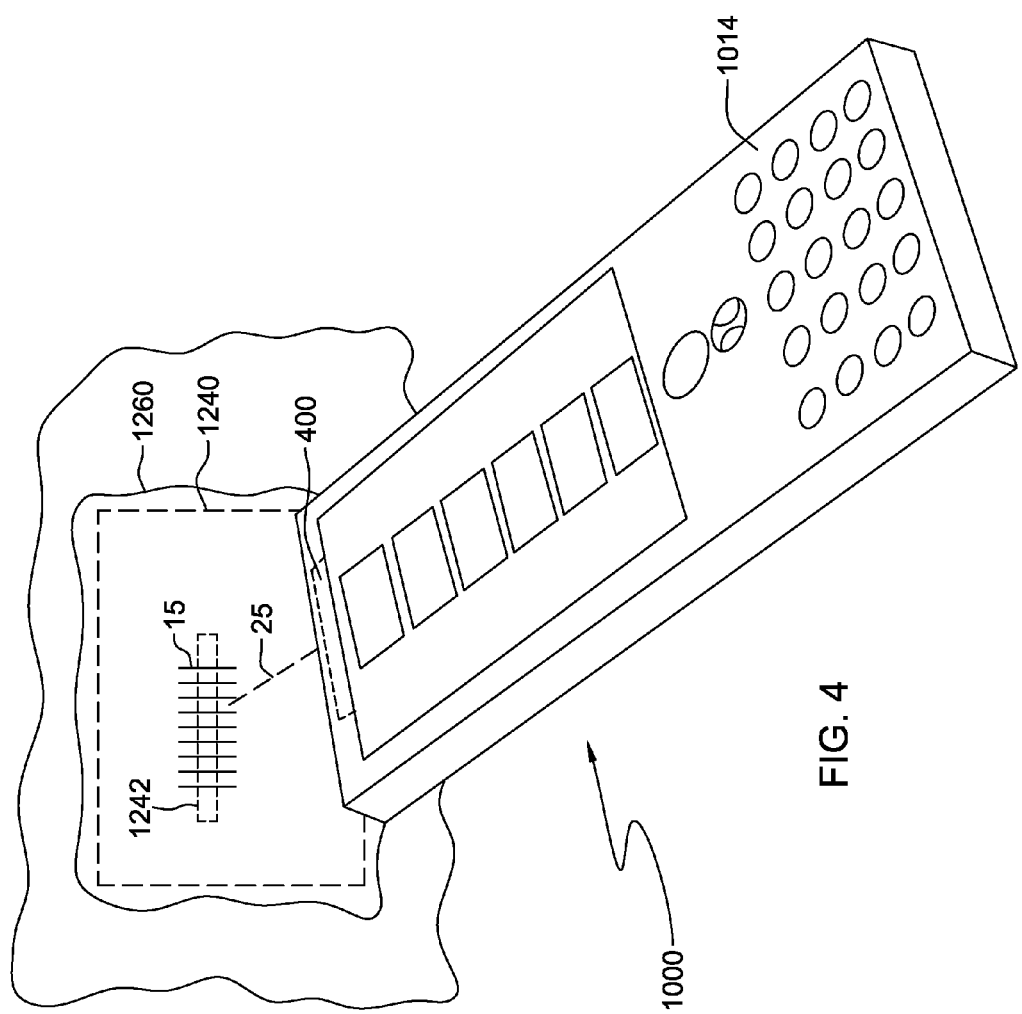
FIG. 4 schematically illustrates one embodiment of the indicia reading apparatus described herein.

FIG. 4 depicts an illustrative embodiment of apparatus 1000. Specifically, apparatus 1000 may have a housing 1014, which may be a hand held housing. Housing 1014 can be configured to encapsulate numerous components of apparatus 1000 described herein supra. Imaging lens assembly 200 can be adapted for focusing an image of decodable indicia 15 located within a field of view 1240 on a substrate, T, onto WLC modules 101a-101z. Imaging light rays can be transmitted about imaging axis 25. Lens assembly 200 can be adapted to be capable of multiple focal lengths and multiple planes of optimum focus (best focus distances).

A small sample of systems methods and apparatus that are described herein is as follows:

A1. An optical indicia reading apparatus comprising:
a microprocessor;
a memory;
a plurality of wafer level camera (WLC) modules, each WLC module of said plurality of WLC modules comprising an image sensor and a focusing lens;
wherein each WLC module of said plurality of WLC modules is configured to output a signal representative of light incident on said image sensor;
wherein an optical axis of a first WLC module of said plurality of WLC modules is spatially disposed relatively to an optical axis of a second WLC module of said plurality of WLC modules so that a field of view (FOV) of said first WLC module at least partially overlaps with a FOV of said second WLC module;
wherein said optical indicia reading apparatus is configured to generate an image frame comprising an image of decodable indicia by processing two or more signals of a plurality of signals outputted by said plurality of WLC modules;
wherein said optical indicia reading apparatus is further configured to store said image frame in said memory; and
wherein said optical indicia reading apparatus is further configured to output at least one of: said image frame, decoded message corresponding to said decodable indicia.

A2. The optical indicia reading apparatus of (A1), further comprising at least one illumination light source.

A3. The optical indicia reading apparatus of (A1), further comprising at least one aiming light source.

A4. The optical indicia reading apparatus of (A1), wherein said processing of two or more signals is performed by said microprocessor.

A5. The optical indicia reading apparatus of (A1), wherein said processing of two or more signals is performed by an application-specific integrated circuit (ASIC).

A6. The optical indicia reading apparatus of (A1), wherein said signal outputted by at least one WLC module is provided by one of: an analog signal, a digital signal.

A7. The optical indicia reading apparatus of (A1), further comprising a portable housing configured to receive said microprocessor, said memory, and said plurality of WLC modules.

B1. An optical indicia reading apparatus comprising:
a microprocessor;
a memory;
a plurality of wafer level camera (WLC) modules, each WLC module of said plurality of WLC modules comprising an image sensor and a focusing lens;
wherein each WLC module of said plurality of WLC modules is configured to output a signal representative of light incident on said image sensor;
wherein a depth of field DOF of a first WLC module of said plurality of WLC modules at least partially overlaps with a DOF of a second WLC module of said plurality of WLC modules;
wherein said optical indicia reading apparatus is configured to generate an image frame comprising an image of decodable indicia by processing two or more signals of a plurality of signals outputted by said plurality of WLC modules;
wherein said optical indicia reading apparatus is further configured to store said image frame in said memory; and
wherein said optical indicia reading apparatus is further configured to output at least one of: said image frame, decoded message corresponding to said decodable indicia.

B2. The optical indicia reading apparatus of (B1), further comprising at least one illumination light source.

B3. The optical indicia reading apparatus of (B1), further comprising at least one aiming light source.

B4. The optical indicia reading apparatus of (B1), wherein said processing of two or more signals is performed by said microprocessor.

B5. The optical indicia reading apparatus of (B1), wherein said processing of two or more signals is performed by an application-specific integrated circuit (ASIC).

B6. The optical indicia reading apparatus of (B1), wherein said signal outputted by at least one WLC module is provided by one of: an analog signal, a digital signal.

B7. The optical indicia reading apparatus of (B1), further comprising a portable housing configured to receive said microprocessor, said memory, and said plurality of WLC modules.

C1. An optical indicia reading apparatus comprising:
a microprocessor;
a memory;
a plurality of wafer level camera (WLC) modules, each WLC module of said plurality of WLC modules comprising an image sensor, a focusing lens, and an optical band-pass filter (BPF) configured to pass light waves within a predefined wavelength range;
wherein a wavelength range of a BPF of a first WLC module of said plurality of WLC modules is different from a wavelength range of a BPF of a second WLC module of said plurality of WLC modules;
wherein each WLC module of said plurality of WLC modules is configured to output a signal representative of light incident on said image sensor;
wherein said optical indicia reading apparatus is configured to generate an image frame by processing one or more signals of a plurality of signals outputted by said plurality of WLC modules;
wherein said optical indicia reading apparatus is further configured to store said image frame in said memory;
wherein said optical indicia reading apparatus is further configured to output at least one of: said image frame comprising an image of decodable indicia, decoded message corresponding to said decodable indicia.

C2. The optical indicia reading apparatus of (C1), further comprising at least one illumination light source.

C3. The optical indicia reading apparatus of (C1), further comprising at least one aiming light source.

C4. The optical indicia reading apparatus of (C1), wherein said processing of two or more signals is performed by said microprocessor.

C5. The optical indicia reading apparatus of (C1), wherein said processing of two or more signals is performed by an application-specific integrated circuit (ASIC).

C6. The optical indicia reading apparatus of (C1), wherein said signal outputted by at least one WLC module is provided by one of: an analog signal, a digital signal.

C7. The optical indicia reading apparatus of (C1), further comprising a portable housing configured to receive said microprocessor, said memory, and said plurality of WLC modules.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. An optical indicia reading apparatus comprising:
   a microprocessor;
   a memory;
   a plurality of wafer level camera (WLC) modules, each WLC module of said plurality of WLC modules comprising an image sensor and a focusing lens;
   wherein each WLC module of said plurality of WLC modules is configured to output a signal representative of light incident on said image sensor;
   wherein an optical axis of a first WLC module of said plurality of WLC modules is spatially disposed relatively to an optical axis of a second WLC module of said plurality of WLC modules so that a field of view (FOV) of said first WLC module partially overlaps with a FOV of said second WLC module by less than 50% of their respective FOVs;
   wherein said optical indicia reading apparatus is configured to generate a single image frame comprising an image of decodable indicia by overlapping and processing two or more signals of a plurality of signals outputted by said plurality of WLC modules to yield the single image frame;
   wherein said optical indicia reading apparatus is further configured to store said single image frame in said memory; and
   wherein said optical indicia reading apparatus is further configured to output at least one of: said single image frame, decoded message corresponding to said decodable indicia.

2. The optical indicia reading apparatus of claim 1, further comprising at least one illumination light source.

3. The optical indicia reading apparatus of claim 1, further comprising at least one aiming light source.

4. The optical indicia reading apparatus of claim 1, wherein said processing of two or more signals is performed by said microprocessor.

5. The optical indicia reading apparatus of claim 1, wherein said processing of two or more signals is performed by an application-specific integrated circuit (ASIC).

6. The optical indicia reading apparatus of claim 1, wherein said signal outputted by at least one WLC module is provided by one of: an analog signal, a digital signal.

7. The optical indicia reading apparatus of claim 1, further comprising a portable housing configured to receive said microprocessor, said memory, and said plurality of WLC modules.

8. An optical indicia reading apparatus comprising:
   a microprocessor;
   a memory;
   a plurality of wafer level camera (WLC) modules, each WLC module of said plurality of WLC modules comprising an image sensor and a focusing lens;
   wherein each WLC module of said plurality of WLC modules is configured to output a signal representative of light incident on said image sensor;
   wherein a depth of field DOF of a first WLC module of said plurality of WLC modules partially overlaps with a DOF of a second WLC module of said plurality of WLC modules by less than 50% of their respective DOFs;
   wherein said optical indicia reading apparatus is configured to generate a single image frame comprising an image of decodable indicia by overlapping and processing two or more signals of a plurality of signals outputted by said plurality of WLC modules to yield the single image frame;
   wherein said optical indicia reading apparatus is further configured to store said single image frame in said memory; and
   wherein said optical indicia reading apparatus is further configured to output at least one of: said single image frame, decoded message corresponding to said decodable indicia.

9. The optical indicia reading apparatus of claim 8, further comprising at least one illumination light source.

10. The optical indicia reading apparatus of claim 8, further comprising at least one aiming light source.

11. The optical indicia reading apparatus of claim 8, wherein said processing of two or more signals is performed by said microprocessor.

12. The optical indicia reading apparatus of claim 8, wherein said processing of two or more signals is performed by an application-specific integrated circuit (ASIC).

13. The optical indicia reading apparatus of claim 8, wherein said signal outputted by at least one WLC module is provided by one of: an analog signal, a digital signal.

14. The optical indicia reading apparatus of claim 8, further comprising a portable housing configured to receive said microprocessor, said memory, and said plurality of WLC modules.

15. An optical indicia reading apparatus comprising:
   a microprocessor;
   a memory;
   a plurality of wafer level camera (WLC) modules, each WLC module of said plurality of WLC modules comprising an image sensor, a focusing lens, and an optical band-pass filter (BPF) configured to pass light waves within a pre-defined wavelength range;
   wherein a wavelength range of a BPF of a first WLC module of said plurality of WLC modules is different from a wavelength range of a BPF of a second WLC module of said plurality of WLC modules;
   wherein a depth of field DOF of a first WLC module of said plurality of WLC modules partially overlaps with a DOF of a second WLC module of said plurality of WLC modules by less than 50% of their respective DOFs;
   wherein each WLC module of said plurality of WLC modules is configured to output a signal representative of light incident on said image sensor;
   wherein said optical indicia reading apparatus is configured to generate a single image frame comprising an image of decodable indicia by overlapping and processing two or more signals of a plurality of signals outputted by said plurality of WLC modules to yield the single image frame;

wherein said optical indicia reading apparatus is further configured to store said single image frame in said memory; and wherein said optical indicia reading apparatus is further configured to output at least one of: said single image frame, decoded message corresponding to said decodable indicia.

16. The optical indicia reading apparatus of claim 15, further comprising at least one illumination light source.

17. The optical indicia reading apparatus of claim 15, further comprising at least one aiming light source.

18. The optical indicia reading apparatus of claim 15, wherein said processing of two or more signals is performed by said microprocessor.

19. The optical indicia reading apparatus of claim 15, wherein said processing of two or more signals is performed by an application-specific integrated circuit (ASIC).

20. The optical indicia reading apparatus of claim 15, wherein said signal outputted by at least one WLC module is provided by one of: an analog signal, a digital signal.

21. The optical indicia reading apparatus of claim 15, further comprising a portable housing configured to receive said microprocessor, said memory, and said plurality of WLC modules.

* * * * *